United States Patent [19]

Usifer et al.

[11] Patent Number: 5,624,759
[45] Date of Patent: Apr. 29, 1997

[54] URETHANE ADHESIVE COMPOSITIONS

[75] Inventors: Douglas A. Usifer, Belle Mead; Ifeanyi C. Broderick, Old Bridge, both of N.J.

[73] Assignee: CasChem, Inc., Bayonne, N.J.

[21] Appl. No.: 381,790

[22] Filed: Jan. 31, 1995

Related U.S. Application Data

[62] Division of Ser. No. 187,426, Jan. 26, 1994, Pat. No. 5,426,166.

[51] Int. Cl.$^6$ .................................................. B32B 27/00
[52] U.S. Cl. .................. 428/424.2; 428/424.6; 428/424.8; 428/425.8
[58] Field of Search ............... 526/301; 427/385.5; 428/424.2, 424.6, 424.8, 425.8

[56] References Cited

U.S. PATENT DOCUMENTS

| | | |
|---|---|---|
| 3,700,643 | 10/1972 | Smith et al. . |
| 3,975,457 | 8/1976 | Chang et al. . |
| 4,011,084 | 3/1977 | Hartmann et al. . |
| 4,034,017 | 7/1977 | Chang et al. . |
| 4,072,770 | 2/1978 | Ting . |
| 4,082,634 | 4/1978 | Chang . |
| 4,112,017 | 9/1978 | Howard . |
| 4,133,723 | 1/1979 | Howard . |
| 4,188,455 | 2/1980 | Howard . |
| 4,192,762 | 3/1980 | Osborn . |
| 4,246,379 | 1/1981 | Howard . |
| 4,309,526 | 1/1982 | Baccei . |
| 4,377,679 | 3/1983 | Schmidle . |
| 4,390,565 | 6/1983 | Fonda . |
| 4,420,499 | 12/1983 | Bolgiano et al. . |
| 4,451,523 | 5/1984 | Nativi et al. . |
| 4,477,327 | 10/1984 | Cassatta et al. . |
| 4,559,118 | 12/1985 | Heil et al. . |
| 4,608,409 | 8/1986 | Coady et al. . |
| 4,717,739 | 1/1988 | Chevreaux et al. . |
| 4,774,306 | 9/1988 | Green et al. . |
| 4,782,129 | 11/1988 | Moschovia et al. . |
| 4,844,604 | 7/1989 | Bishop et al. . |
| 4,902,757 | 2/1990 | Kordomenos et al. . |
| 4,920,157 | 4/1990 | Schulz et al. . |
| 4,938,831 | 7/1990 | Wolf . |
| 4,954,591 | 9/1990 | Belmares . |
| 4,964,938 | 10/1990 | Bachmann et al. . |
| 4,985,523 | 1/1991 | Mochizuki et al. . |
| 4,992,524 | 2/1991 | Coady et al. . |
| 5,030,665 | 7/1991 | Lee et al. . |
| 5,093,386 | 3/1992 | Bishop et al. . |
| 5,102,552 | 4/1992 | Callahan et al. . |
| 5,135,964 | 8/1992 | Lee et al. . |
| 5,166,186 | 11/1992 | Kojime et al. . |
| 5,178,952 | 1/1993 | Yamamoto et al. . |
| 5,200,438 | 4/1993 | Fujii et al. . |

FOREIGN PATENT DOCUMENTS

| | | | |
|---|---|---|---|
| 0263749 | 4/1988 | European Pat. Off. | 526/301 |
| 7263749 | 4/1988 | European Pat. Off. | 526/301 |
| 0510572 | 10/1992 | European Pat. Off. | 526/301 |
| 3320918 | 12/1983 | Germany | 526/301 |
| 58-187481 | 11/1983 | Japan | 526/301 |
| 62-227916 | 10/1987 | Japan | 526/301 |
| 63-186722 | 8/1988 | Japan | 526/301 |
| 3155939 | 7/1991 | Japan | 428/424.2 |
| 3199217 | 8/1991 | Japan | 526/301 |
| 3255117 | 11/1991 | Japan | 526/301 |
| 4198312 | 7/1992 | Japan | 526/301 |
| 5269914 | 10/1993 | Japan | 428/424.2 |
| 2070634 | 9/1981 | United Kingdom | 526/301 |

*Primary Examiner*—Joseph L. Schofer
*Assistant Examiner*—N. Sarofim
*Attorney, Agent, or Firm*—Pennie & Edmonds

[57] ABSTRACT

UV curable adhesive compositions which provide improved bonding to substrates such as carbonates and metals is provided. The compositions are formed as the reaction product of a urethane methacrylate and reactive diluents such as N-vinyl caprolactam and isobornyl acrylate, a photoinitiator compound, and adhesion promoting additives. Urethane methacrylates which may be employed include ester-based urethane methacrylates as well as ether based urethane methacrylates. Also, methods of bonding substrates using their compositions and the articles produced by the methods.

18 Claims, No Drawings

URETHANE ADHESIVE COMPOSITIONS

This is a division of U.S. patent application Ser. No. 08/187,426, filed Jan. 26, 1994, U.S. Pat. No. 5,426,166.

FIELD OF THE INVENTION

The invention relates to UV-curable adhesives. More particularly, the invention relates to UV-curable adhesive compositions of urethane (meth)acrylates and reactive diluents.

BACKGROUND OF THE INVENTION

Increasing concern with energy, environmental protection, and health factors have cooperated to enhance the potential of radiation curable compositions as adhesives. These adhesive compositions typically comprise a polymerizable mixture that can be applied as a thin film to a substrate and polymerized by exposure to a radiation source such as an electron beam, plasma arc, ultra violet light ("UV"), and the like.

Compositions which are curable under the influence of radiation in general, and ultra-violet light in particular, are well known. Unfortunately, these known compositions suffer from a number of disadvantages. For example, many of these compositions have insufficient flexibility that causes them to crack in use when applied to flexible substrates. Other compositions do not adhere sufficiently to substrates such as carbonates and metals with the undesirable result that the laminated layers become dislodged or peel. Still other compositions require use of solvents that must be evaporated during curing. Evaporation of such solvents increases production time, consumes energy and creates atmospheric pollution problems.

A need therefore continues for radiation curable adhesive compositions which remain homogeneous, which can be readily and uniformly applied to substrates and which show improved adherence to substrates such as carbonates and metals.

SUMMARY OF THE INVENTION

In accordance with the invention, UV curable adhesive compositions which provide improved bonding to substrates such as plastics and metals are provided. The compositions are formed as blends of urethane (meth)acrylates, at least one reactive diluents such as N-vinyl caprolactam and isobornyl acrylate, a photoinitiator compound and optional adhesion promoting agents. Urethane (meth)acrylates which may be employed include ester urethane (meth)acrylates as well as ether urethane (meth)acrylates. Urethane methacrylates useful in the invention typically have a molecular weight of about 2,000 to about 20,000 and a (NCO:OH) ratio less than about 2.5:1, preferably between about 1.1:1 to about 2.0 to 1. As used herein, the term (meth)acrylates encompasses both methacrylates and acrylates.

In a further embodiment of the invention, the adhesive compositions can include compounds to provide secondary thermal curing of the composition. These compounds enable the composition to be heated to thermally cure the adhesive. This ensures that portions of the adhesive which are shadowed or potentially shadowed from UV light are cured.

The adhesive compositions of the invention may be employed to bond a variety of materials including but not limited to plastics such as flexible and rigid polyethylene, polycarbonate, flexible and rigid polyvinylchloride, stainless steel, polystyrene, polyethylene, tin, cellulose propionate, acryonitrile-butadiene-styrene and mylar.

In a further embodiment of the invention, the urethane (meth)acrylates and reactive diluents are mixed with an epoxy adduct or epoxy methacrylate adduct of carboxy terminated butylene nitrile (CTBN) to yield adhesives which provide excellent bonding to metals or other non-polar substrates. The compositions of this embodiment achieve surprisingly strong bonding, good flow, rapid cure rates, and wetting to disparate substrates such as polycarbonate and stainless steel.

The UV curable adhesive compositions of the invention can be employed to bond materials by exposing a laminate of substrate/adhesive/substrate to UV light to cure the adhesive. As an alternative, the compositions can be applied as an open surface bonder to one or more substrates prior to curing.

Having briefly summarized the invention, the invention will now be described in detail by reference to the following specification and non-limiting examples. Unless otherwise specified, all percentages are by weight and all temperatures are in degrees Celsius.

DETAILED DESCRIPTION OF THE INVENTION

The adhesive compositions of the invention are formed as the reaction product of a urethane (meth)acrylate and reactive diluents. Urethane (meth)acrylates which may be employed include ester urethane (meth)acrylates as well as ether urethane (meth)acrylates. Useful reactive diluents include but are not limited to N-vinyl caprolactam, isobornyl acrylate, and caprolactone.

The urethane (meth)acrylates employed in the compositions of the invention are formed by reacting an NCO-terminated urethane oligomer with a monofunctional nucleophilic methacrylate monomer such as hydroxyethyl acrylate, hydroxyethyl methacrylate, hydroxypropylmethacrylate, aminoethyl methacrylate, preferably hydroxypropylmethacrylate. These urethane (meth)acrylates typically comprise 20–80%, preferably 50% of the adhesive composition.

Urethane (meth)acrylates useful in the invention may be obtained by a number of known processes. For example, a polyisocyanate and a polyol may be reacted to form an isocyanate-terminated urethane prepolymer that is subsequently reacted with a (meth)acrylate such as 2-hydroxy ethylacrylate. These types of reactions may be conducted at room temperature or higher, optionally in the presence of catalysts such as tin catalysts, tertiary amines and the like.

The isocyanate terminated urethane prepolymers employed in the invention have a NCO:OH ratio with respect to the polyol compound of at least about 1.1:1.0, preferably about 1.1–2.5:1.0, and an average hydroxyl functionality of the polyol component of at least about 2, preferably from about 2 to 4, most preferably from about 2 to about 3.

Suitable urethane prepolymers can be prepared according to known methods such as those described above from the above precursors, keeping in mind the ranges for NCO:OH ratio and average hydroxyl functionality. Such prepolymers preferably are prepared neat. These polymers also can be prepared in the presence of diluents copolymerizable with the unsaturated urethane resin but which are inert with respect to the prepolymer reaction and the subsequent reaction between the urethane prepolymer and the monomeric organic compounds employed to cap the urethane oligomer.

Polyisocyanates which can be employed to form isocyanate-functional urethane prepolymers can be any organic isocyanate having at least two free isocyanate groups. Included within the purview of suitable polyisocyanates are aliphatic and cycloaliphatic isocyanates, as these terms are generally interpreted in the art. Thus it will be appreciated that any of the known polyisocyanates such as alkyl and alkylene polyisocyanates, cycloalkyl and cycloalkylene polyisocyanates, and combinations such as alkylene and cycloalkylene polyisocyanates can be employed in the present invention. Suitable polyisocyanates therefore include, without limitation, 2,2,4-trimethylhexamethylene-1,6-diisocyanate, hexamethylene-1,6-diisocyanate, cyclohexyl-1,4-diisocyanate, 4,4'methylene-bis(cyclohexyl isocyanate), 1,1'-methylenebis(4-isocyanato) cyclohexane, isophorone diisocyanate, 4,4'-methylene diphenyl diisocyanate and the like.

Suitable polyfunctional hydroxy-containing polymers, or polyols, which can be reacted with polyisocyanates to yield urethane prepolymers useful in the invention have a plurality of hydrogen atoms which are labile with respect to an isocyanate group. The choice of polyols may be selected to provide desired end properties for the adhesive. Polyol compounds having at least two hydroxyl groups per molecule which are suitable for use in preparing the urethane resins include, but are not limited to condensates of lactones and polyfunctional alcohols such as those produced from caprolactone and ethylene glycol, propylene glycol, trimethylol propane and the like. Other useful polyols are polyester polyols, especially those produced from acyclic reactants such as adipic acid and azelaic acid, and alkylene glycols. Poly(neopentyl adipate) is a useful example. Small amounts of cyclic compounds may be included in the formation of the polyester polyols useful of this invention. Still other useful polyols are polyether polyols such as poly(propylene glycol), poly(ethylene glycol), poly(tetramethylene glycol), and the like, or mixtures therefrom. In general, polyols useful in the invention have molecular weights between about 500 and about 5,000, preferably between about 1,000 and about 3,000. The choice of polyols may be selected to provide desired end properties for the adhesive.

As mentioned, the isocyanate terminated urethane prepolymer is capped with a (meth)acrylate to produce a urethane (meth)acrylate oligomer. In general, any (meth)acrylate-type capping agent having a terminal amine or hydroxyl group and also having an acrylic or methacrylic moiety can be employed, with the methacrylic moiety being preferred. Examples of suitable capping agents include hydroxyethyl acrylate, hydroxyethyl methacrylate, hydroxypropyl acrylate, hydroxypropyl methacrylate, aminoethyl acrylate, and the like, preferably hydroxypropyl methacrylate. Reactive diluents useful in the composition of the invention include but are not limited to N-vinyl caprolactam, N-vinyl amides such as N-vinyl pyrolidone (NVP), carboxylic acid esters such as isobornyl (meth)acrylate, lauryl (meth)acrylate, and (meth)acrylic acids, and caprolactone acrylate. The reactive diluents may be included in amounts of 20 to 80% by weight of the adhesive composition depending on the reactive diluent employed. Accordingly, (meth)acrylate diluents may be included in amounts of about 20–80% by weight of the composition; (meth)acrylic acid diluents may be included in amounts of about 20–80% by weight of the composition; N-vinyl amide diluents may be included in amounts of up to about 80%, preferably 30–50% by weight of the composition. Most preferably, the N-vinyl amide is N-vinyl-caprolactam present in an amount of about 35% of the composition.

In a further embodiment, epoxy adducts or epoxy methacrylate adducts of carboxy terminated butylene nitrile may be reacted with or formulated with the urethane (meth)acrylates. The adducts may be present in an amount of up to about 10%, preferably 0.5–4%, most preferably 1–2% of the composition.

Reactive diluent mixture which can be employed with the above urethane (meth)acrylate oligomers in the UV radiation curable compositions of this invention include any of such mixtures which have been or are being used for this purpose. Broadly, suitable reactive diluent mixtures comprise at least one unsaturated addition-polymerizable monomer which is copolymerizable with the unsaturated urethane resin upon exposure to radiation. The reactive diluent can be monofunctional or polyfunctional. A single polyfunctional diluent can be used, as can mixtures thereof. A combination of monofunctional reactive diluents and polyfunctional reactive diluents is preferred. The reactive diluent mixture typically is from about 20 to about 80, preferably about 40 to about 60 weight percent of the curable composition based on total weight of unsaturated urethane resin and reactive diluent. Particularly preferred reactive diluent mixtures are a mixture of N-vinyl caprolactam and isobornyl (meth) acrylate.

Other vinyl monomers can be employed in combination with the aforementioned vinyl-containing monomers as reactive diluents. These additional vinyl monomers include esters of $C_1$–$C_8$ monohydric alcohols and acrylic or methacrylic acids, preferably (meth)acrylic acids such as methyl methacrylate, ethyl acrylate, butyl acrylate, butyl methacrylate, octyl acrylate, 2-ethylhexyl acrylate, and the like. Other vinyl-containing compounds which may be employed include divinyl monomers, trivinyl monomers, tetravinyl monomers, and mixtures thereof. These di-, tri- and tetravinyl compounds are preferably acrylates, methacrylates or vinyl hydrocarbons. The most preferred are esters of acrylic or methacrylic acids and polyhydric $C_2$–$C_8$ alcohols such as neopentylglycol dimethacrylate, 1,3-butylene dimethacrylate, trimethylolpropane triacrylate, 1,6-hexanediol diacrylate, pentaerythritol triacrylate, pentaerythritol tetraacrylate, and the like.

The urethane acrylate adhesive compositions of the invention also include a photoinitiator to facilitate curing of the composition by UV-radiation. Photoinitiators are generally organic components which upon exposure to light of appropriate wavelength yield or promote production of polymerization initiating species. Many different types of free-radical initiators and sensitizers useful in acrylic systems are well known in the art.

A photoinitiator compound generally is employed when curing is performed with a low energy radiation source such as ultra-violet light radiation. The amount of photo initiator generally is in the range of about 1 to about 8, preferably about 2 to about 5 parts by weight per 100 parts by combined weight of the urethane acrylate resin and the reactive diluent system.

Useful photoinitiators include alpha-hydroxy aryl ketone-type compounds such as 1-hydroxycyclohexyl phenyl ketone (Irgacure 184 Available From CIBA GEIGY). Other useful initiators include hydrogen abstraction-type compounds such as benzophenone, substituted benzophenone, either alone or in combination with compounds which have labile hydrogens. Included among the many suitable photoinitiators are 2-benzyl-2,N,N-dimethylamino-1-(4-morpholinophenyl)-1-butanone (Irgacure 369 From CIBA-GEIGY), 2,2-dimethoxy-2-phenylacetophenone (Esacure KB-1 available from Sartomer), or trimethylbenzophenone blends such as those available from Sartomer as Esacure TZT. Still other useful photoinitiators are onium salt-type initiators which generate free radicals and cationic species upon exposure to UV light. Examples of these initiators include but are not limited to mixed triarylsulfonium hexafluoroantimonate salts such as UVI-6974 available from Union Carbide, or mixed triaryl sulfonium hexafluorophosphate salts such as UVI-6990 available from Union Carbide. Based on availability, solubility in the composition of the invention, and efficiency of curing at minimum UV levels, preferred photoinitiators for use in the invention include 2,2-diethoxyacetophenone, benzophenone, and 2-ethylhexyl-2 cyano 3,3-diphenyl acrylate.

In a further embodiment as discussed below, the resin compositions may include soluble peroxides such as benzoyl peroxide, or soluble hydroperoxides such as cumene hydroperoxide, or soluble azonitrile compounds such as azobisisobutyronitrile to facilitate secondary thermal curing of the compositions of the invention.

In yet another embodiment, organofunctional silanes may be included in the compositions of the invention for adhesion promotion. Such organofunctional silane materials can be employed optionally in the formulation to promote adhesion to various substrates. Examples of useful silanes include but are not limited to trialkoxy-functional silane materials such as vinyl trimethoxy silane (A-171 available from Union Carbide) and vinyl trimethoxy silane (A-151 available from Union Carbide). Functionalized trialkoxy silanes also can be employed during the manufacture of the urethane methacrylate resin to bind the silane into the polymer backbone. Examples of useful functionalized trialkoxy silanes include but are not limited to gamma-aminopropyl triethoxysilanes such as A-1100 or A-1101 from Union Carbide, amino functional silanes such as A-1170 from Union Carbide, gamma-mercaptopropyltrimethoxysilanes such as A-189 from Union Carbide, and isocyanato functional silanes such as gamma-isocyanatopropyl triethoxysilane, A-1310 from Union Carbide. These organosilane materials can be employed in amounts of up to about 8% by weight, more preferably about 1–3% by weight of the total composition.

The adhesive compositions of the invention can be applied by any conventional method, including brushing, dipping, flow coating, dispensing and the like, but they are most often applied by pressure. Usual positive pressure feed techniques and equipment can be utilized. The compositions can be applied over virtually any substrate, including wood, metals, glass, cloth, plastics, foams, and the like, as well as over various primers.

The flow properties and sprayabilities of the adhesive compositions are determined by well known methods. Sprayability can be determined by using a spray gun such as an air suction spray gun operating at 60 psi with a No. 30 air cap. High sprayabilities are desirable. Above a maximum concentration, however, the adhesive composition may string out and give a web-like spray pattern upon spraying.

To be suitable for use with conventional pressure dispensing and spreading machinery for liquid materials, it is desirable for the adhesive compositions to have a viscosity of less than about 50,000 cps, preferably about 100 to about 10,000 cps, more preferably about 2,000 to about 8,000 cps, as measured at 25° C. on a Brookfield LV viscometer.

In a further embodiment of the invention, there is provided a method of producing a laminate which involves bonding a first sheet of clear, transparent plastic to a second sheet of clear, transparent plastic with the adhesive compositions of the invention. The laminate of sheets with a layer of the adhesive composition therebetween is exposed to radiation to cure the adhesive and bond the sheets together.

The novel adhesive compositions of the invention are curable by exposure to radiation, preferably ultraviolet light. The compositions may be radiation cured at temperatures between room temperature (20°–25° C.) and the temperature at which significant vaporization of its most volatile component may be initiated, ordinarily between about 40° C. and about 80° C. Curing can be performed by placing the adhesive coated substrates on a conveyor and exposing them to a source of ultraviolet radiation.

The time period required to cure the adhesive compositions of the invention is related to the time for which the minimum dose of radiation is absorbed by the adhesive layer. The radiation period therefore depends on the spectral distribution of the source, the power thereof, the distance thereof from the substrate to be irradiated and the optical transmission of that layer of the substrate which must be penetrated by the radiation before reaching the adhesive. Thus the radiation period can be determined by those skilled in the art according to the optical properties of each material of the laminate used.

As UV radiation sources, mercury vapor lamps which have an emission spectrum largely above 0.3 u are convenient. One or more lamps of 20 W to about 10 KW can be used, e.g., a 2 kW type HTQ7 lamp made by PHILIPS, or a high-pressure mercury vapor lamp giving 80 W/cm made by HANOVIA. Argon or krypton lamps can also be used. Alternatively, microwave-initiated sources such as those supplied by FUSION SYSTEMS may be employed.

The invention can be further understood by referring to the following examples. It should be understood that these specific examples are presented by way of illustration and not by way of limitation. Unless otherwise specified, all reference to "parts" is intended to mean parts by weight.

EXAMPLE 1 Synthesis of ester urethane methacrylate Resin

A 2000 mL reaction flask is fitted with a mechanical stirrer and a nitrogen gas inlet. The apparatus is flushed with nitrogen and charged with 555 g of Desmodur W (available from MILES, INC., 4.20 equivalent of NCO). The agitator is turned on and 1389 g of TONE 2221 (Available from UNION CARBIDE CORP, 2.80 equivalent of OH) is added slowly. After 10 minutes, 3 drops of C1707 Catalyst (available from CASCHEM, INC.) is added and the reaction mixture is stirred for 10 minutes. The reaction mixture is heated to 70° C. and stirred for 2.5 hours. The % equivalents of NCO is determined by titration to be 3.04.

The reactor is cooled to 50° C. and 235 g of hydroxypropylmethacrylate (available from Rohm & Haas Co. under the name ROCRYL 410, 1.50 equivalents OH) is added slowly, dropwise to the reaction mixture. The temperature of the reaction mixture is raised to 60° C. and maintained for 5 hours. The % equivalents of NCO is determined by titration to be 0.33%. The reaction mixture is cooled and discharged to provide a ester urethane methacylate.

EXAMPLE 1A: Preparation of UV-Adhesive formulation 450 g of the urethane methacrylate resin prepared in EXAMPLE 1 is added to a mixture formed of 255 g N-vinylcaprolactam, 110.5 g isobornyl acrylate and 34 g of IGACURE 184 (Available from CIBA-GEIGY CORP.) The formulation is mixed thoroughly with an automatic mixer and degassed. The resulting mixture is clear, colorless, and has a viscosity of 3,700 cps as tested on a Brookfield cone and plate viscometer. A 6"×6", 50 mil thick slab of the resulting mixture is prepared by casting the liquid mixture, allowing it to level, and curing it with UV radiation from a FUSION lamp equipped with a "D" bulb. The slab is tack-free after 2 passes at 10 feet/minute. The stress/strain properties are tested on an Instron force tester. The adhesive has an ultimate Tensile strength of 2700 PSI and an Elongation at Break of 84%.

EXAMPLE 1B: Use of the composition of EXAMPLE 1A as a UV-curable adhesive for polycarbonate A 0.2 g sample of the adhesive of EXAMPLE 1A is applied 0.5" above an edge of a first polycarbonate strip of a 2"×0.5"×0.07" piece of non-UV inhibited polycarbonate. A second strip of the same polycarbonate composition of equal dimensions is placed onto the first strip of polycarbonate to provide a laminated lap shear sample. The sample is treated with UV light of filament D by utilizing two×10 feet/minute passes to cure the adhesive. The laminated sample is destructively evaluated using the polycarbonate adhesive test. A value of 5 is obtained, indicating excellent adhesiveness.

The polycarbonate adhesive test is performed by destructively delaminating the cured, laminated sample with hand pliers. The strength of the adhesive bond is rated according to the following numerical system:
1. Strips delaminate with no effort, indicating no adhesion between layers.
2. Strips delaminate with some effort, and the plastic substrates show some evidence of cohesive failure, indicating some adhesion between layers.
3. Some effort is required to delaminate the strips. Strips come apart in-tact, i.e., polycarbonate from one strip does not remain on another polycarbonate strip; evidence of cohesive failure whereby some polycarbonate in a strip is torn, indicating adhesion.
4. One or more polycarbonate strips fracture during the delamination, indicating that strength of the adhesive bond is greater than the strength of the polycarbonate, i.e., good adhesion.
5. Polycarbonate plastic breaks at the bondline before the adhesive can yield, indicating that the adhesive bond is stronger than the plastic, i.e, excellent adhesion.

EXAMPLE 1C Use of adhesive composition of EXAMPLE 1A as a UV-curable adhesive with mylar film A mylar film is treated with a 0.5 g portion of the adhesive of EXAMPLE 1A. Into this portion is placed a small tin electrical connector. The adhesive is cured as Example 1B with two 10 feet/minute passes to provide a tack-free solid. An excellent bond between the adhesive and the mylar results. Additionally, the bond to the tin connector embedded in the adhesive is very good.

EXAMPLE 2 Synthesis of Ester Urethane methacrylate Resin

A 2000 ml reaction flask is fitted with a mechanical stirrer and a nitrogen gas inlet. The apparatus is flushed with nitrogen and charged with 295 g of Desmodur W (2.23 equivalents of NCO). The agitator is turned on and 923 g of TONE 2221 (1.86 equivalent OH) is added slowly. After 10 minutes, 3 drops of C-1707 catalyst is added, and the reaction mixture is stirred an additional 10 minutes. The reaction mixture is heated to 70° C. and stirred for 2.5 additional hours. The % equivalents of NCO is determined by titration to be 1.50.

The reactor is cooled to 50° C. and 63 g of hydroxypropylmethacrylate (0.43 equivalent OH) is added slowly, dropwise to the reaction mixture. The temperature of the reaction mixture is raised to 60° C. and maintained for 5 hours. The % equivalents of NCO is determined by titration to be 0.08%. The reaction mixture is cooled and discharged.

EXAMPLE 3: Synthesis of epoxy methacrylate derivatives

A 1000 mL reaction flask is fitted with a mechanical stirrer, an inlet with a long tube to deliver submerged air, and an air outlet. The flask is charged with 323 g of EPI-REZ 58034 (RHONE-POULENC, INC., 1.11 equivalent epoxide), 96.3 g of methacrylic acid (1.12 equivalent acid) and 2.1 g of N,N-diethylethanolamine. The reaction mixture is stirred with a slow, submerged air purge and maintained at 60° C. for 24 hours. The temperature is increased to 80° C. and the reaction is stirred an additional 30 hours. The acid value of the resulting clear, amber liquid is 7.35. The resulting amber liquid final product is then cooled and discharged to provide an epoxy methacrylate derivative.

EXAMPLE 4: Preparation of UV-Adhesive formulation 343 grams of the urethane methacrylate of Example 2 is added to a mixture formed of 322 g of isobornyl acrylate and 28 g of Irgacure 184 to provide formulation (A). 7 g of the resin of EXAMPLE 3 is added to formulation (A) to provide formulation (B). Formulation (B) is mixed using an automatic mixer and degassed to provide a clear, slightly amber mixture. The viscosity, tested as in Example 1, is 46,500 cps.

A 6"×6", 50 mil thick layer of the mixture is cast into a mold and allowed to level. The layer is cured as in Example 1B by using two 10 feet/minute passes to provide a tack-free plastic layer. The physical properties of the plastic layer are: Ultimate Tensile: 3,100 PSI; % Elongation at break: 220%, Hardness (shore D) 52D.—Instron, stated in Example 1.

EXAMPLE 4A: Use of the composition of EXAMPLE 4 as a UV-curable adhesive

A 3 mil film of the adhesive of EXAMPLE 4 is drawn down onto a stainless steel panel. The film is cured as in Example 1B by two 10 feet/minute passes to provide a tack-free film. A cross-hatch adhesion test (ASTM D-3359) revealed 100% adhesion of the film to the stainless steel panel.

EXAMPLE 5: Preparation of UV-Adhesive Cross-over Composition 220 g of a urethane methacrylate resin of Example 2 is added to a mixture of 165 g of N-Vinylcaprolactam, 132 g of isobornyl acrylate, and 22 g of Irgacure 184 to provide a first mixture. To this first mixture is added 5.5 g of the epoxy methacrylate resin of EXAMPLE 3 and 5.5 g of tris(ethoxy) vinyl silane (A-151 from UNION CARBIDE) to provide formulation (C). Formulation (C) is mixed with an automatic mixer and degassed to give a clear, slightly amber liquid. A 6"×6"×50 mil layer of the liquid is cast and cured using two 10 ft/min as described in Example 1B to give a clear, tack-free plastic layer. The tested viscosity of the plastic layer is 11,400 cps. The tested physical properties of the cast layer are: Ultimate Tensile: 1825 PSI; % Elongation at Break: 260%; Hardness (SHORE D) 45D.

EXAMPLE 5A: Use of Composition of EXAMPLE 5 as a UV-curable adhesive for Polycarbonate and Stainless Steel A 3 mil thick film of the adhesive of EXAMPLE 4 is drawn down onto a stainless steel panel and cured as in Example 1B except that one pass at 10 feet/minute is employed to provide a tack-free film. A cross-hatch adhesion test on the substrate revealed 100% adhesion of the substrate to stainless steel. A 0.2 gram sample of the cross-over adhesive of EXAMPLE 4 is applied between two polycarbonate strips as described in EXAMPLE 1B. The strips are cured with two 10 feet/minute passes as in Example 1B to provide extremely strong bonding between the polycarbonate strips. Destructive delamination testing by the polycarbonate adhesion test indicated that the adhesive strength had a value of 5.

Additionally, a strip of polycarbonate is laminated onto a 3 mil film of this liquid adhesive on a steel plate. Upon curing as above, a very strong bond between the stainless steel and the polycarbonate resulted.

EXAMPLE 6: Preparation of ether Urethane Methacrylate Resin

A 2 liter reaction flask is charged with 429 grams of DESMODUR W (MILES LABORATORIES) and 1099 grams of TERATHANE 1000 (UNION CARBIDE). After stirring for 10 minutes, 2 drops of C1707 (CASCHEM) are added, and the mixture is heated to 65° C. and held for 3 hours. The reaction mixture is tested for %NCO and found to have a value of 3.68%. Next, 42 grams of hydroxyethyl methacrylate are added to the mixture, and the mixture is agitated at 65° C. for 3 additional hours. The tested %NCO value is 0.23%. The mixture is cooled and discharged. Gel Permeation Chromatography on the finished product gave a peak at a mw of 8,000 amu.

EXAMPLE 6A: Preparation of a UV-curable adhesive utilizing the resin of Example 6

A UV curable adhesive formulation is prepared containing 225 grams of the resin described in Example 6, 135 grams of n-vinylcaprolactam, 67.5 grams of isobornyl acrylate and 22.5 grams of 1-hydroxycyclohexylphenyl ketone (CIBA GEIGY IRGACURE 184). The mixture is thoroughly mixed and de-gassed, and a clear, slightly amber liquid results. Tests on the mixture gave Viscosity (Brookfield cone/plate, 25° C.)=5,500 cps.

EXAMPLE 6B: Use of the adhesive composition of EXAMPLE 6A as a UV curable adhesive A small amount of the UV adhesive described in Example 6A is applied to ¼" of the inside of a hollow tube of cellulose propionate. The tube measures ¾" diameter and has a 20 mil wall thickness. The length of the tube is four inches. An end cap formed from a solid piece of polyvinylchloride is placed into the tube and laminated to the tube with the adhesive. The end cap extends ¼" into the inside of the tube. The laminated tube is passed under a FUSION SYSTEMS F300 UV light source equipped with a "D" bulb for 2×10 feet/ minute passes to provide a strongly bonded system. The adhesion is tested by squeezing the cellulose propionate tube in an attempt to force the polyvinylchloride piece to delaminate from the tube wall. Utilizing this adhesive, the bond between the cellulose propionate and the polyvinyl chloride did not break after 100 hand squeezes. The hand squeezes are performed by hand squeezing the center of the tube until the tube collapses at the point at which the hand squeeze is applied. The cellulose propionate plastic cracked and broke before delamination, thereby indicating that an extremely strong bond had formed.

We claim:

1. A method for bonding a plurality of substrates together comprising:

applying to at least a portion of a surface of a first substrate an adhesive comprising (A) a polyester urethane acrylate or (meth)acrylate or an isocyanate-terminated urethane prepolymer capped with an acrylate or (meth)acrylate compound and (B) at least one reactive diluent of an N-vinyl amide or carboxylic acid ester to form an adhesive coating thereon;

contacting the adhesive coated surface portion of the first substrate with at least a portion of a surface of a second substrate; and subjecting the adhesive to energy sufficient to cure the adhesive and bond the first and second substrates together.

2. The method of claim 1 wherein the energy is ultraviolet radiation or heat.

3. The method of claim 1 wherein the adhesive is applied to the first substrate by brushing, dipping, flow coating or spraying.

4. The method of claim 1 which further comprises selecting the first or second substrate to be plastic or metal.

5. The method of claim 1 which further comprises providing a photoinitiator in the adhesive in an amount sufficient to assist in curing.

6. The method of claim 5 wherein the photoinitiator is an alpha-hydroxy phenyl ketone, a benzophenone, or a substituted benzophenone combined with a compound having a labile hydrogen, and is present in an amount of about 1–8% by weight of the adhesive.

7. The method of claim 1 wherein the N-vinyl amides are selected from the group of N-vinylcaprolactam and N-vinyl pyrrolidone and are present in an amount of about 20–80% of the adhesive.

8. The method of claim 1 wherein the carboxylate esters are acrylates or (meth)acrylates and are present in an amount of about 20–80% of the adhesive.

9. The method of claim 1 wherein the urethane acrylate or (meth)acrylate is the reaction product of an NCO-terminated urethane and a mono functional nucleophilic (meth)acrylate.

10. The method of claim 1 wherein the urethane acrylate or (meth)acrylate is the reaction product of an isocyanate and a polyether or polyester polyol.

11. The method of claim 1 which further comprises selecting the urethane methacrylate to be a urethane hydroxypropyl methacrylate having a molecular weight of about 2,000 to about 20,000 and a (NCO:OH) ratio between about 1:1 to about 1:2, and selecting the diluents to be a mixture of reactive diluents of N-vinyl caprolactam iso-bornyl (meth)acrylate, and caprolactone acrylate, said mixture being present in an amount of 40–60% of the adhesive; and including a photoinitiator in the adhesive to assist in curing.

12. The method of claim 1 which further comprises selecting the urethane (meth)acrylate to include about 35% by weight of N-vinyl caprolactam, and about 4% by weight of 1-hydroxy cyclohexyl phenyl ketone.

13. The multilayer laminated article produced by bonding the first and second articles according to the method of claim 1.

14. A multilayer laminated structure comprising at least two substrates which are joined by a cured adhesive of a composition comprising a urethane (meth)acrylate and at least one reactive diluent of an N-vinyl amide or carboxylic acid ester.

15. The multilayer laminated structure of claim 14 wherein the urethane methacrylate is a urethane hydroxypropyl methacrylate having a molecular weight of about 2,000 to about 20,000 and a (NCO:OH) ratio between about 1:1 to about 1:2, and the diluents comprise a mixture of reactive diluents of N-vinyl caprolactam iso-bornyl (meth) acrylate, and caprolactone acrylate, said mixture being present in an amount of 40–60% by weight of the adhesive.

16. The multilayer laminated structure of claim 14 wherein the urethane (meth)acrylate comprises about 35% by weight of N-vinyl caprolactam, and about 4% by weight of 1-hydroxy cyclohexyl phenyl ketone.

17. The multilayer laminated structure of claim 14 wherein the substrates comprise plastic or metal.

18. The multilayer laminated structure of claim 14 wherein at least one substrate is rigid polyethylene, polycarbonate, flexible polyvinylchloride, rigid polyvinylchloride, stainless steel, polystyrene, polyethylene, tin, cellulose propionate, acrylonitrile-butadiene-styrene or mylar.

* * * * *